United States Patent Office 3,428,257
Patented Feb. 18, 1969

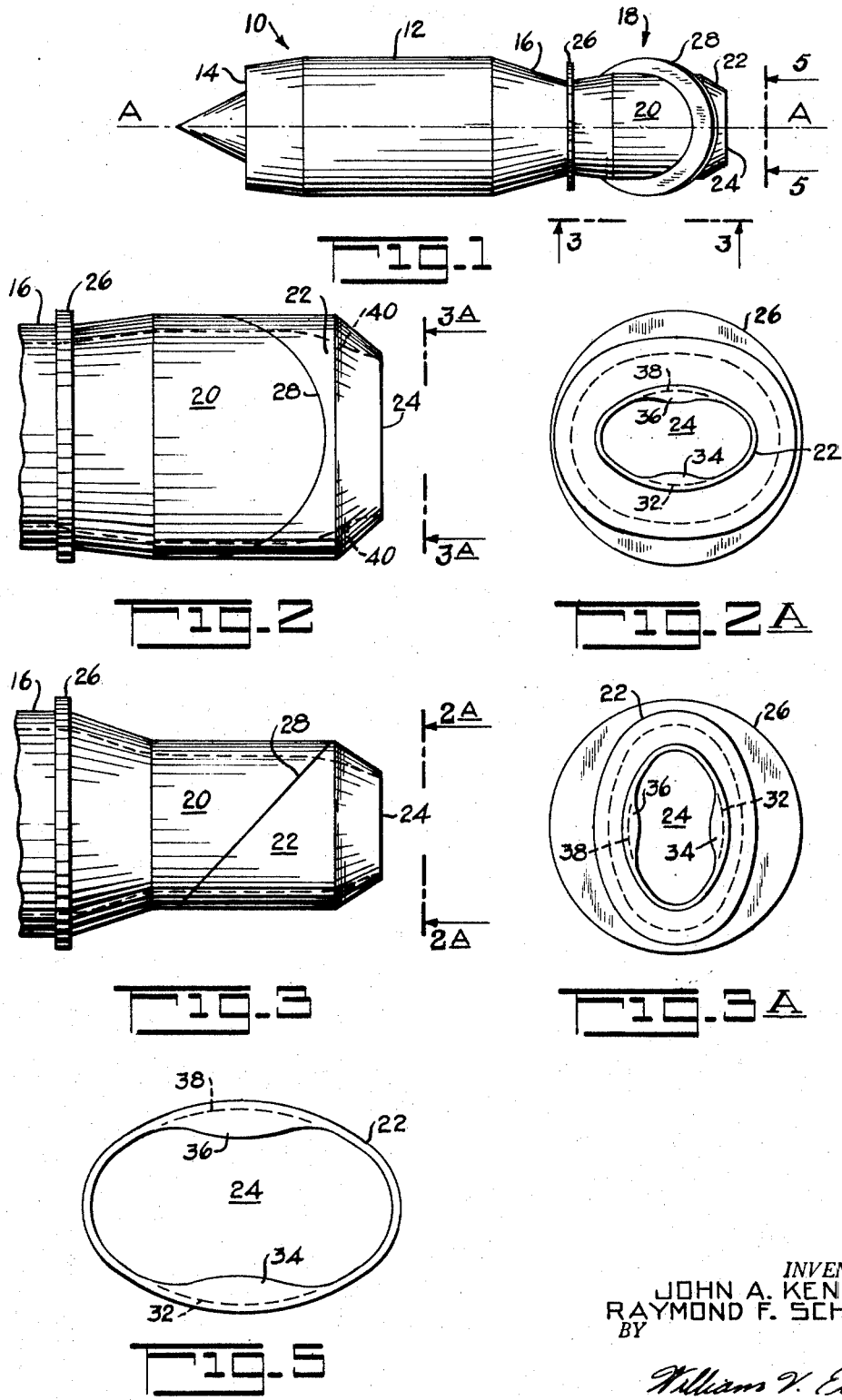

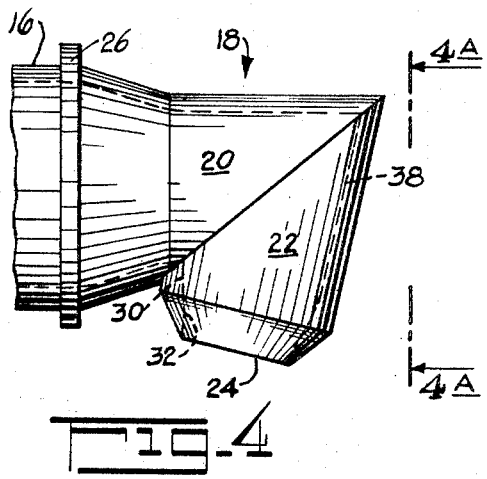
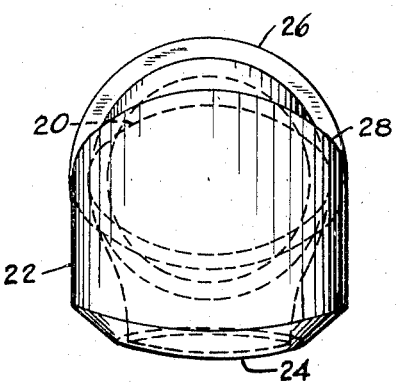
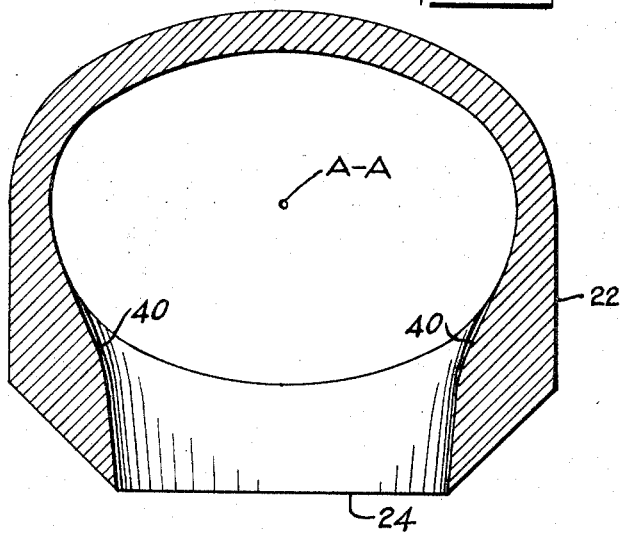
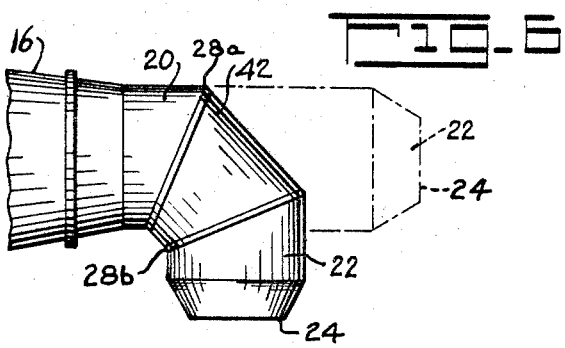

3,428,257
THRUST VECTORING EXHAUST NOZZLE WITH FLOW GUIDE FOR MINIMIZING SEPARATION OF THE JET STREAM
John A. Kentfield, Hasbrouck Heights, and Raymond F. Schaefer, North Galdwell, N.J., assignors to Curtiss-Wright Corporation, a corporation of Delaware
Filed June 3, 1966, Ser. No 555,097
U.S. Cl. 239—265.35                     10 Claims
Int. Cl. B64c *15/08;* F02k *1/20;* B05b *1/34*

ABSTRACT OF THE DISCLOSURE

A jet engine exhaust nozzle (for VTOL aircraft) having elliptical sections that are relatively angularly movable in a single plane is provided with guide vanes at the minor axis of the end elliptical section of the nozzle and additional guide vanes on the major axis of said section extending from the end guide vanes to a circular joint between nozzle sections. Turbulence is thereby prevented and a constant effective nozzle throat area provided for during transition of the nozzle from cruise to a fully vectored position.

---

This invention relates to thrust vectoring nozzles for jet-lift vertical or short take-off aircraft and is particularly directed to aerodynamic improvements in lift/cruise type thrust-vectoring exhaust nozzles for said aircraft.

The invention is preferably embodied in a thrust vectoring nozzle of the rotational type having a single inclined bearing although it is not intended that the invention be limited to a single inclined bearing nozzle. It is desirable that high thrust performance be achieved during all operating conditions, that is, during cruise, full vectored position and transition between the first two positions. It is further desirable to provide a constant effective nozzle throat area so that a fixed area nozzle can be used and the engine operation can be maintained without requiring appreciable adjustments of the operating conditions. If, for example, a constant effective nozzle throat area cannot be maintained, the engine operating conditions will be a variable and will require substantially constant adjustment during changes in the disposition of the vectoring nozzle. One solution to this problem which has been proposed makes use of a variable area nozzle throat. However, variable area nozzle throats are relatively complicated and expensive mechanisms and their operation present one more variable to be controlled.

It is one object of the invention to provide a fixed area nozzle for a rotational type vectoring exhaust nozzle wherein the effective nozzle throat area can be maintained constant during all phases of operation. A major problem in the application of vectoring type exhaust nozzles lies in the variation of the effective nozzle throat area due to flow separation of the exhaust gases from the nozzle throat surface, particularly in the full vectored position. It has been further found that, during transition of the nozzle from the cruise position to the fully vectored position, turbulence develops in the gas flow which also affects the thrust output. In accordance with the invention, means are provided which compensate for the flow separation in rotational type vectoring nozzles and for reducing undesirable turbulence in the gas flow during transition from the cruise position to the fully vectored position.

In general, the invention comprises an exhaust nozzle which includes a plurality of rotational sections which are joined along at least one inclined oblique plane relative to the engine axis with the downstream section of the nozzle including the nozzle throat or exit portion at its downstream end. Each of the nozzle sections has an elliptical shape with the inclined joint between adjoining nozzle sections being circular in shape. The joint connecting the nozzle to the jet engine also has a circular shape so that the individual nozzle sections may be rotated in a circular plane relative to one another with the downstream nozzle section being movable through a radial plane passing through an axis coincident to the engine axis during transition from the cruise position to the fully vectored position. In accordance with the invention, the downstream section of the exhaust nozzle is provided with gas flow guide means on the inner surface of said section, preferably at least along the inner edge portion of the minor axis of the elliptically shaped nozzle exit, which gas flow guide means compensates for the area of flow separation of the gas flow from the nozzle surface during the full vectored attitude position so that the effective area of the nozzle exit is kept substantially constant. Preferably, gas flow means for guiding the exhaust gases are also provided along the inner surface of the downstream section of the nozzle in the region of the major axis of the elliptically shaped section which gas flow guide means extend in a direction forwardly or upstream from the nozzle exit portion to the region of the inclined bearing joint connecting the downstream nozzle section to its adjacent nozzle section which gas flow guide means are effective to prevent turbulence of the exhausting gases, particularly during transition from the cruise position to the fully vectored position.

Accordingly, it is one object of the invention to provide a novel and improved vectoring type exhaust nozzle for a jet engine.

It is another object of the invention to provide a novel and improved vectoring-type nozzle for a jet engine wherein the effective exit area of the nozzle throat portion may be maintained substantially constant during engine operation.

It is an additional object of the invention to provide a novel and improved vectoring-type exhaust nozzle for a jet engine wherein turbulence of the exhaust gases passing through said nozzle is minimized so that the thrust output of the exhaust nozzle will be relatively unaffected during transition from the cruise position to the fully vectored position.

Other objects and advantages of the invention will be best understood upon reading the following detailed description with the accompanying drawings in which:

FIG. 1 shows a side view of a jet engine embodying the present invention;

FIG. 2 is a diagrammatic side view of the rotational type vectoring nozzle shown in the cruise position;

FIG. 2A is a view of the nozzle of FIG. 3 taken in a direction of line 2A—2A;

FIG. 3 is a diagrammatic top plan view of the nozzle of FIG. 2;

FIG. 3A is an end view of FIG. 2 taken in the direction of line 3A—3A;

FIG. 4 is a diagrammatic view of the exhaust nozzle of the invention shown in the fully vectored position;

FIG. 4A is an end view taken in the direction of line 4A—4A of FIG. 4;

FIG. 5 is an enlarged end view of the exit portion of the nozzle of FIG. 1 taken in the direction of line 5—5 of FIG. 1;

FIG. 6 is a view of the exhaust nozzle in the lift position taken in the direction along the engine axis from the downstream end thereof with a portion of the exhaust nozzle shown in section; and FIG. 7 is a diagrammatic view of an other embodiment of the invention.

Referring to the drawings, there is shown in FIG. 1 a jet engine 10 of a known gas turbine type including an outer housing 12 surrounding and defining an inlet portion 14 at the upstream end thereof and a jet pipe 16 at the downstream end thereof. Included in the jet engine 10 but not illustrated, is a compressor, combustors and a turbine for generating a gas flow which is fed into the jet pipe section 16 in a known manner whereby during engine operation as a consequence of passing the gases through an exhaust nozzle, a forward propulsive thrust is produced. As indicated above, the invention is directed to the application of a vectoring nozzle for use in vertical or short take-off type aircraft. In accordance with the invention, an exhaust nozzle 18 is connected to the engine jet pipe 16, which nozzle 18 is of the rotational vectoring type.

The exhaust nozzle 18 is preferably composed of at least first and second rotatable nozzle sections 20 and 22, respectively, with the nozzle section 22 having a convergent nozzle exit portion 24 at its downstream end for discharging the exhaust gases from the jet engine 10 into the atmosphere and thereby producing the forward propulsive thrust of the engine (FIGS. 1–6). The exhaust nozzle 18 is joined to the jet pipe 16 of the engine 10 by a bearing 26 which may be of any suitable type that permits relative rotation between the nozzle section 20 and the jet pipe section 16. As illustrated in FIGURES 2–4A the plane including the bearing 26 has a circular profile for permitting relatively free rotation between the nozzle section 20 and the jet pipe 16.

The exhaust nozzle sections 20 and 22 are preferably formed with an elliptical shape. By providing the nozzle sections 20 and 22 with an elliptical shape, the inclined bearing 28 shown for example in FIGS. 3 and 4, can be kept as a circular shape to permit full relative rotation between the sections 20 and 22 and the jet pipe 16. As is known, if the sections 20 and 22 were circular, an inclined section through the two sections 20 and 22 would result in an ellipse which would not permit full relative rotation between the nozzle sections 20 and 22. The inclined bearing 28 is preferably included in a plane which is oblique to the axis A—A of the engine 10 and is preferably at an angle of approximately 50°. For purposes of clarity of illustration, the inclined bearing 28 has been shown as a single line in FIGS. 2–4 instead of having a flanged bearing such as that shown in FIG. 1. By providing the construction of the nozzle thus far described, the downstream exhaust nozzle section 22 can be vectored from a cruise position wherein the axis of said section 22 is coincident with the axis A—A of the engine 10 to a position 100° relative to said axis A—A. Further, by providing the construction of two elliptical exhaust nozzle sections joined at circular bearings, as shown in the embodiment of FIGS. 1–6 the downstream section 22 can be vectored through a radial plane passing through the axis A—A without pointing sideways in either direction during transition from the cruise position to the fully vectored position. Preferably, motive means are provided for rotating the two nozzle sections in opposite directions from one another to produce the strictly radial motion for vectoring the nozzle section 22. Such means are well known in the art and no invention is alleged in the motive means itself.

Referring to FIGS. 4 and 4A, the nozzle section 22 is shown therein as being in the fully vectored position which is preferably 100° from the horizontal. It has been found that, during the flow of the gases from the jet pipe 16 through the nozzle section 20 and the nozzle section 22 for discharge through the nozzle exit portion 24, the gas does not adhere to the inner surface 30 of the exhaust nozzle section 22, particularly as the gas is required to bend from the nozzle section 20 in the direction of the nozzle exit 24 when the nozzle is in the fully vectored position. More specifically, the gases tend to separate from the inner surface 30 at the bend between the nozzle sections 20 and 22 so that, at the inner surface portion 32 of the nozzle exit, there will be a separation between said inner surface and the gases exiting from the nozzle exit 24. It will be seen therefore, that the effective area of the nozzle exit 24 will be substantially lessened and thereby result in a reduction of the actual mass flow of the gases from the nozzle exit 24. As is well known, the thrust output of the engine is dependent upon the mass flow of the gases from the nozzle exit 24 so that, it will be seen, that when the nozzle is in the fully vectored position, the thrust will vary from that which is produced when the nozzle is in the cruise or non-vectored position. Because of this, the basic operation of the engine will change during vectoring. Means may be provided such as a variable area nozzle for varying the nozzle exit area during the lift position to compensate for the variation in thrust output. However, variable area nozzles are relatively complicated in structure and present a further variable requiring control.

In accordance with the invention, means are provided to compensate for the loss of effective area of the nozzle exit 24 due to the separation of the gases from the nozzle inner surface. Referring to FIGS. 2A, 3 and 3A, as shown therein gas flow guide means 34 are provided in the region of the minor axis at the inner surface of the nozzle exit and substantially in the plane of said exit, which gas flow guide means 34 has a shape that substantially coincides with the separation area of the gases from the inner surface 32 of the nozzle exit. By providing the gas flow guide means 34 at the inner surface wherein the gas separation normally takes place, the effective area of the nozzle 24 can be kept at a constant level since the total effective area will be utilized for discharge of the gases from said nozzle exit 24. In order to keep the total mass flow of the gases at the desired level, the nozzle exit can be enlarged to compensate for the addition of the gas flow guide means 34 which cuts down from the total exit area in the normal nozzle exit. Thus, by provision of the gas flow guide means 34, the total effective area will be kept at a constant level and the mass flow of gases from said nozzle 24 will be at the desired level by compensating for the size of the total area. Gas flow guide means 36 may be also provided in the region of the minor axis at the inner surface of the upper portion of the nozzle opposite from the gas flow guide means 34 to make the nozzle exit area symmetrical. As seen in FIG. 5 the gas flow guide means 34 and 36 are disposed at the minor axis portions of the nozzle exit 24 and may be comprised of, inserts into the nozzle exit, added material or by forming the nozzle exit in the shape illustrated which may be described as substantially a trochoidal shape. In other words, it may be said that the nozzle exit has a multi-lobed configuration with the region including the lobe junctions comprising the gas flow guide means.

It has been further found, that during transition of the downstream section of the exhaust nozzle 22 from the cruise position to the fully vectored position, that a substantial amount of turbulence occurs in the gas flow as the gas is required to turn at the bend in the exhaust nozzle during transition. The turbulence in the gas flow is of the type generally associated with gas flows through sharp bends or elbows and is also complicated by the fact that the nozzle sections 20 and 22 are rotating during the transition which induces turbulence through friction of the rotating surface with the gas flowing adjacent thereto. It will be apparent therefore, that, if turbulence is present upstream of the nozzle exit or throat 24, there will be a loss in energy in the gas flow which will affect the nozzle pressure ratio and the thrust output. In accordance with the invention, gas flow guide means are provided in the region of the major axis of the elliptical nozzle section in the downstream nozzle section 22 which gas flow guide means extends from a region adjacent to the nozzle exit 24 upstream to the inclined bearing section 28. As illustrated in FIGS. 2 and 6, it will be seen that the interior surface of the nozzle section 22, at its inner surface adjacent to the major axis portion, is modified from its elliptical shape by providing added material in the form of an insert or by varying the shape of the nozzle material itself, as illustrated at 40. By providing the gas flow means in the region of the major axis, it has been found that the turbulence during the transition period is substantially reduced which therefore minimizes the energy losses in the gas flow so that the thrust output will remain substantially the same during the transition period from the cruise position to the fully vectored position.

FIG. 7 shows another embodiment wherein the invention is incorporated in an exhaust nozzle 18 having three rotatable sections, an upstream section 20, a downstream section 22 and an intermediate section 42. The three section nozzle 18 is connected to the jet pipe 16 of the engine 10 through a circular bearing 26 and has two inclined circular bearing sections 28a and 28b. The invention comprising the gas flow guide means 34, 36 and 40, described above, is also incorporated in the downstream nozzle section 22 of the embodiment of FIG. 7, which includes the nozzle exit 24. The gas flow guide means 40 in the major axis portion of the elliptical nozzle section 22 extends from a region adjacent to the nozzle exit 24 to a region at least adjacent to the inclined bearing 28b, similar to that described in relation to the embodiment of FIGS. 1–6. The operation of the embodiment of FIG. 7 is substantially the same as described above with the exception that vectoring is accomplished through three rotatable nozzle sections instead of two.

It will be seen from the above detailed description that a rotational type vectoring nozzle is provided wherein high thrust performance is maintained during all operating conditions and a constant effective nozzle throat area is maintained so that a fixed area nozzle can be used and engine operation maintained without requiring an appreciable adjustment of the operating conditions. An engine of the gas turbine type which is provided with a rotational vectoring type nozzle of the invention can operate with an essentially fixed throttle position with high thrust performance being maintained over the full range of vectoring angle from 0° to 100° which could not heretofore be achieved without the provision of either a variable area nozzle or constant variation in the engine operating conditions.

While the invention has been described in detail in the above paragraphs, it will be apparent to those skilled in the art that various modifications and changes may be made without departing from the spirit in scope thereof as defined in the appended claims.

We claim:

1. An exhaust nozzle construction for a lift/cruise engine having a substantially circular jet pipe opening at its downstream end for passing a jet stream therethrough and comprising at least a first and second elliptically shaped nozzle sections with said first nozzle section having a circular inlet opening at its upstream end connected to the downstream end of said jet pipe for receiving said jet stream from said jet pipe and said first nozzle section being disposed for relative rotation with said jet pipe, said first nozzle section also having a circular outlet opening at its downstream end defined in a plane which is oblique to the longitudinal axis of said first nozzle section, a second elliptically shaped nozzle section having a circular inlet opening defined in a plane which is oblique to the longitudinal axis of said second nozzle section and including a jet nozzle at its downstream end, and said first and second nozzle sections being disposed for relative rotation such that during relative rotation of said first and second nozzle sections said second nozzle section moves through a radial plane passing through the longitudinal axis of said first nozzle section between a first position wherein the longitudinal axis of said second nozzle section is coincident with the axis of said first nozzle section for substantially straight through flow of said jet stream and a second relatively downwardly oriented position wherein the longitudinal axis of said second nozzle section is substantially perpendicular to the axis of said first nozzle section whereby when said second nozzle section is in said second position and jet stream will flow from a direction parallel to the longitudinal axis of said first nozzle section to a substantially downward direction parallel to the longitudinal axis of said second nozzle section; and said second nozzle section including gas flow guide means at the inner surface thereof at least at its downward side in the region of its minor axis for minimizing separation of the jet stream from the inner surface of said jet nozzle when said second nozzle section is in its second position whereby substantially the total effective area of said jet nozzle will be utilized during all operation positions of said second nozzle section.

2. An exhaust nozzle construction as recited in claim 1 wherein said second nozzle section further includes gas flow guide means on its inner surface in the region on both sides of its major axis with said gas flow guide means adjacent the major axis extending from adjacent to said jet nozzle upstream to adjacent to said inlet opening of said second nozzle section for minimizing turbulence in said jet stream during transition of said second nozzle section between said first and second positions.

3. An exhaust nozzle construction as recited in claim 1 wherein said jet nozzle inner surface has a substantially trochoidal shape.

4. An exhaust nozzle construction as recited in claim 1 wherein the inner surface of said jet nozzle has a two-lobed profile including a lobe junction extending radially inwardly from said inner surface adjacent each end of its minor axis with each said lobe junction comprising said gas flow guide means.

5. An exhaust nozzle construction as recited in claim 1 further comprising at least three elliptically shaped nozzle sections with said third nozzle section being disposed intermediate of said first and second nozzle sections for relative rotation therewith and said third nozzle section having a circular inlet opening disposed in juxtaposition and in a plane parallel with the outlet opening of said first nozzle section and a circular opening at its downstream end disposed in juxtaposition and in a plane parallel with the inlet opening of said second nozzle section.

6. An exhaust nozzle construction for a lift/cruise engine having a substantially circular jet pipe opening at its downstream end for passing a jet stream therethrough, said exhaust nozzle construction comprising first and second elliptically shaped nozzle sections with said first nozzle section having a circular inlet opening at its upstream end connected to the downstream end of said jet pipe for receiving said jet stream from said jet pipe and disposed for relative rotation with said jet pipe, said first nozzle section having a circular outlet opening at its downstream end defined in a plane which is oblique to the longitudinal axis of said first nozzle section; said second elliptically shaped nozzle section having a circular inlet opening defined in a plane which is oblique to the longitudinal axis of said second nozzle section, and said first and second nozzle sections being disposed for relative rotation such that during relative rotation of said first and second nozzle sections said second nozzle section moves through a radial plane passing through the longitudinal axis of said first nozzle section between a first position wherein the longitudinal axis of said second nozzle section is coincident with the axis of said first nozzle section for substantially straight through flow of said jet stream and a second relatively downwardly oriented position wherein the longitudinal axis of said second nozzle section is at least perpendicular to the axis of said first nozzle section whereby when said second nozzle section is in said second position said jet stream will flow from a direction parallel to the longitudinal axis of said first nozzle section to a substantially downward direction parallel to the longitudinal axis of said second nozzle section; and said second nozzle section having a substantially elliptically shaped jet nozzle at its downstream end for discharge of said jet stream therethrough with said jet nozzle inner surface having a portion thereof deviating radially inwardly from its elliptical shape at least at the downward side thereof in the region of its minor axis such that when said second nozzle section is in the second position separation of the jet stream from the jet nozzle inner surface will be minimized and the effective discharge area of said jet nozzle will remain substantially constant for all operative positions of said second nozzle section.

7. An exhaust nozzle construction as recited in claim 6 wherein the inner surface of said jet nozzle adjacent to its minor axis at the radially outward side thereof deviates from its elliptical shape in an amount equal to the deviation on its radially inward side adjacent to its minor axis so that the discharge area of said jet nozzle is symmetrical about its major and minor axis.

8. An exhaust nozzle construction as recited in claim 7 wherein said jet nozzle inner surface has a substantially trochoidal shape.

9. An exhaust nozzle construction as recited in claim 6 wherein the inner surface of said second nozzle section in the region of its major axis deviates from said elliptical shape from a region adjacent to said jet nozzle upstream to a region adjacent the inlet opening of its adjacent nozzle section such that the inner surface of said second nozzle section is symmetrical about its major and minor axes whereby turbulence in the flow of said jet stream is minimized during transition of said second nozzle section from said first position to said second position.

10. An exhaust nozzle construction for a lift/cruise engine having a substantially circular jet pipe opening at its downstream end for passing a jet stream therethrough, said exhaust nozzle construction comprising, first and second elliptically shaped nozzle sections with said first nozzle section having a circular inlet opening at its upstream end connected to the downstream end of said jet pipe for receiving said jet stream from said jet pipe and disposed for relative rotation with said jet pipe, said first nozzle section having a circular outlet opening at its downstream end defined in a plane which is oblique to the longitudinal axis of said first nozzle section, said second elliptically shaped nozzle section having a circular inlet opening defined in a plane which is oblique to the longitudinal axis of said second nozzle section and including a jet nozzle at its downstream end, and said first and second nozzle sections being disposed for relative rotation such that during relative rotation of said first and second nozzle sections said second nozzle section moves through a radial plane passing through the longitudinal axis of said first nozzle section between a first position wherein the longitudinal axis of said second nozzle section is coincident with the axis of said first nozzle section for substantially straight through flow of said jet stream and a second relatively downwardly oriented position wherein the longitudinal axis of said second nozzle section is at least perpendicular to the axis of said first nozzle section whereby when said second nozzle section is in said second position said jet stream will flow from a direction parallel to the longitudinal axis of said first nozzle section to a substantially downward direction parallel to the longitudinal axis of said second nozzle section; and said second nozzle section including gas flow guide means disposed on its inner surface in the region on both sides of its major axis with said gas flow guide means extending from adjacent to said jet nozzle in a direction upstream to adjacent to said inlet opening of said second nozzle section for minimizing turbulence in the flow of said jet stream during transition of said second nozzle section between said first and second positions.

References Cited

UNITED STATES PATENTS

| | | | |
|---|---|---|---|
| 2,546,293 | 3/1951 | Berliner | 60—271 X |
| 2,681,547 | 6/1954 | MacDonald | 239—590.5 X |
| 2,886,262 | 5/1959 | Fletcher | 239—265.35 X |
| 2,933,891 | 4/1960 | Britt | 239—265.35 |
| 3,137,131 | 6/1964 | Tyler et al. | 60—271 X |
| 3,260,049 | 7/1966 | Johnson | 239—265.35 |
| 3,327,480 | 6/1967 | Günter | 239—265.35 X |

OTHER REFERENCES

Günter, Siegfried: German DAS No. 1,150,879. Published in June, 1963.

M. HENSON WOOD, JR., *Primary Examiner.*

HOWARD NATTER, *Assistant Examiner.*

U.S. Cl. X.R.

239—590, 599, 601; 60—232, 271